Feb. 19, 1957　　　　　L. H. SMILEY　　　　2,781,607
GRAVITY OPERATED LIQUID DISPENSER
Filed Nov. 10, 1954

Lemuel H. Smiley
INVENTOR.

United States Patent Office 2,781,607
Patented Feb. 19, 1957

2,781,607

GRAVITY OPERATED LIQUID DISPENSER

Lemuel H. Smiley, Knoxville, Tenn., assignor of forty percent to Mary R. Smiley, Knoxville, Tenn.

Application November 10, 1954, Serial No. 467,987

4 Claims. (Cl. 43—131)

This invention relates to an exterminator for insects and rodents and more particularly to a novel baited poison trap for pests.

The primary object of the present invention resides in the provision of an unobtrusive baited poison trap for insects and rodents which is adapted to attract and kill rats, mice, roaches, water bugs, ants and other insects and rodents that may enter.

The construction of this invention especially features a housing having apertures therethrough through which the pests may enter. There is removably received in the housing a disk which is coated with an insecticide and which has food for the insects or rodents in receptacles with one of the receptacles receiving poison by gravity feed from a container mounted within the housing.

Still further objects and features of this invention reside in the provision of an insect and rodent baited trap that is simple in construction, highly efficient in operation, easy to bait, and which is inexpensive to manufacture thereby permitting wide distribution and utilization.

These, together with the various ancillary objects and features of the invention which will become apparent as the following description proceeds, are attained by this gravity operated liquid dispenser for insect and rodent extermination, a preferred embodiment of which has been illustrated in the accompanying drawings, by way of example only, wherein.

Figure 1:
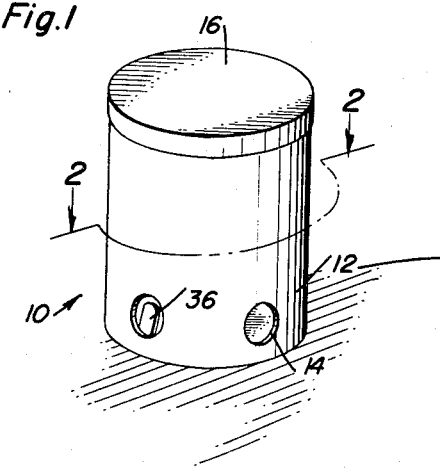
Figure 1 is a perspective view of the device comprising the present invention.
Figure 3:
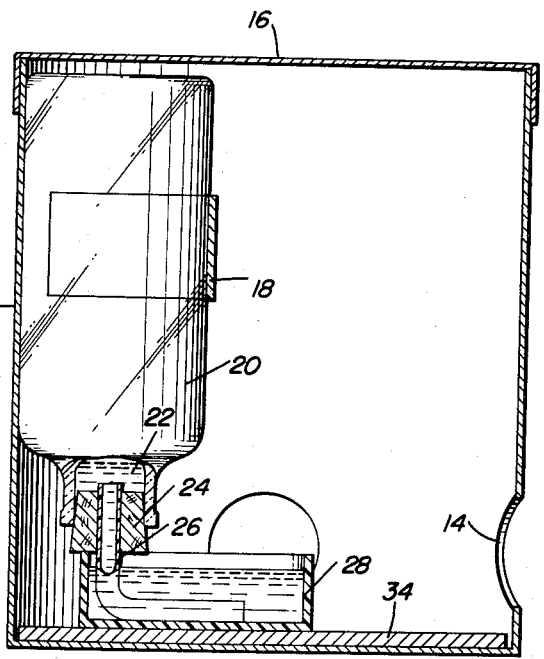
Figure 3 is an enlarged vertical sectional view as taken along the plane of line 3—3 in Figure 2 illustrating the construction of the various elements of the invention in detail.
Figure 2:
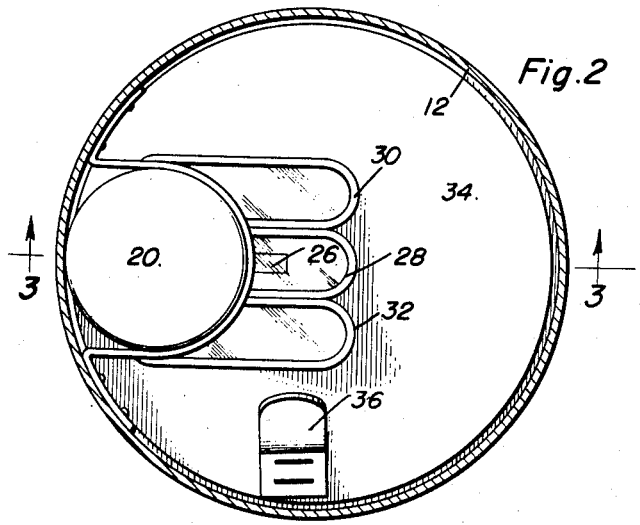
Figure 2 is a horizontal sectional view as taken along the plane of line 2—2 in Figure 1 and being shown in an enlarged scale for greater clarity.

With continuing reference to the accompanying drawings wherein like reference numerals designate similar parts throughout the various views, reference numeral 10 generally designates the insect and rodent trap and exterminator comprising the present invention. This device includes a housing 12 which is shown to be of circular cylindrical configuration but which may be of any desired shape. The side wall of the housing 12 is provided with suitable apertures 14 therethrough preferably slightly raised above the bottom of the trap so as to retain dead bodies of insects or rodents therein. The upper end of the housing 12 is provided with a removable lid 16.

Mounted within the housing 12 and secured to the side wall thereof is a suitable retaining bracket 18 which is adapted to receive a cylindrical bottle or container 20 which is adapted to be arranged in an inverted position and which contains a liquid poison for rodents as is indicated at 22. The cork 24 of the bottle or container 20 is perforated for reception of a tubular conduit 26 formed of glass or other similar material which is adapted to slowly permit flow of fluid from the container into a trough-like receptacle 28 centrally disposed between two other receptacles 30 and 32, the receptacles 30 and 32 being adapted to be baited with food or the like for the rodents and insects.

The receptacles 28, 30 and 32 are secured to the upper surface of a disk or plate 34 which is removably positioned within the housing 12 and which is provided with a handle 36 for enabling the ready lifting of the plate out of the housing 12. The plate or disk 34 may be coated with a suitable insecticide for paralizing any insects such as water bugs, ants, roaches, or the like which may walk thereon after entering through the apertures 14. It is to be recognized that since the bugs have been so paralized, they will not be able to depart through the apertures 14 thereby retaining these insects within the housing 12. In addition, any mice, rats, or the like that enter through the apertures 14 will be poisoned by the flow of fluid from the container 20 into the food receptacle 28 and thus poison the food in receptacle 28. The food in receptacle 28 being in intimate relation with the food in receptacles 30 and 32 and by capillary action will cause the poisoning of the food in receptacles 30 and 32.

Due to the action of the liquid poison 22, any rodents entering the casing 12 and partaking of the food used as bait will be poisoned and die and thus be retained within the casing 12 since it is somewhat difficult for them to leave the casing 12 due to the relatively small size of apertures 14 which are raised above the bottom of the trap and which are difficult for poison and panic stricken rodents to locate.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An insect and rodent exterminator comprising a housing having entrance apertures therethrough, a plurality of receptacles arranged in side by side abutting relationship in said housing with the outer of the receptacles receiving bait therein, a liquid poison dispenser removably secured to the inner wall of said housing, a tubular conduit connecting said dispenser with one of said receptacles, and a removable disk in said housing, said receptacles being secured to said disk.

2. An insect and rodent exterminator comprising a housing having entrance apertures therethrough, a plurality of receptacles arranged in side by side abutting relationship in said housing with the outer of the receptacles receiving bait therein, a liquid poison dispenser removably secured to the inner wall of said housing, a tubular conduit connecting said dispenser with one of said receptacles, a removable disk in said housing, said receptacles being secured to said disk and means for grasping said disk for removal of said disk from said housing.

3. An insect and rodent exterminator comprising a housing having entrance apertures therethrough, a plurality of receptacles arranged in side by side abutting relationship in said housing with the outer of the receptacles receiving bait therein, a liquid poison dispenser removably secured to the inner wall of said housing, a tubular conduit connecting said dispenser with one of said receptacles, a removable disk in said housing supporting said receptacles, said disk being coated with an insecticide.

4. An insect and rodent exterminator comprising a housing having entrance apertures therethrough, a plurality of receptacles arranged in side by side abutting relationship in said housing with the outer of the receptacles receiving bait therein, a liquid poison dispenser removably secured to the inner wall of said housing, a tubular conduit connecting said dispenser with one of said receptacles, a removable disk in said housing, said receptacles being secured to said disk, and means for grasping said disk for removal of said disk from said housing, said disk being coated with an insecticide.

References Cited in the file of this patent

UNITED STATES PATENTS

| | | |
|---|---|---|
| 742,304 | Francis | Oct. 27, 1903 |
| 886,934 | Bradford | May 5, 1908 |
| 1,086,610 | Nunes | Feb. 10, 1914 |
| 1,139,030 | Goldhammer | May 11, 1915 |
| 1,321,360 | Bright | Nov. 11, 1919 |
| 1,964,611 | Watson | June 26, 1934 |
| 2,315,772 | Closs | Apr. 6, 1943 |
| 2,532,681 | Stover | Dec. 5, 1950 |
| 2,568,168 | Query | Sept. 18, 1951 |
| 2,635,382 | Kuntz | Apr. 21, 1953 |

FOREIGN PATENTS

| | | |
|---|---|---|
| 411,996 | Germany | 1925 |